(12) United States Patent
Didion et al.

(10) Patent No.: US 6,595,267 B2
(45) Date of Patent: *Jul. 22, 2003

(54) LINER LOCK KEY FOR TUMBLER LINER SEGMENTS

(75) Inventors: Michael S. Didion, St. Charles, MO (US); Charles J. Didion, St. Charles, MO (US)

(73) Assignee: Didion Manufacturing Company, St. Louis, MS (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/924,349

(22) Filed: Aug. 8, 2001

(65) Prior Publication Data

US 2002/0023729 A1 Feb. 28, 2002

Related U.S. Application Data

(63) Continuation-in-part of application No. 09/398,286, filed on Sep. 20, 1999, now Pat. No. 6,273,176.

(51) Int. Cl.$^7$ .......................... B22D 45/00; B22D 29/00; F16L 23/00
(52) U.S. Cl. ............................ 164/269; 164/404; 164/5; 164/131; 403/380; 403/379.4; 403/375; 403/335
(58) Field of Search ................................ 164/404, 269, 164/401, 131, 5; 403/380, 379.4, 378, 345, 375, 335

(56) References Cited

U.S. PATENT DOCUMENTS

| 3,998,262 | A | * | 12/1976 | Didion | ....................... 164/131 |
| 4,502,808 | A | | 3/1985 | Didion et al. | |
| 5,638,887 | A | | 6/1997 | Didion | |
| 5,638,890 | A | | 6/1997 | Didion et al. | |
| 6,273,176 | B1 | * | 8/2001 | Didion | ....................... 164/131 |

* cited by examiner

Primary Examiner—M. Alexandra Elve
Assistant Examiner—Kevin McHenry
(74) Attorney, Agent, or Firm—Paul M. Denk (57) ABSTRACT

A tumbling unit such as a casting shake-out unit, rotary media drum, sand reclaimer or the like, is provided. The tumbling unit includes a cylindrical outer shell and a cylindrical inner shell. The inner liner is formed of a series of interfitting segments. The segments each have an inner surface, an outer surface, side edges, a front edge, a back edge, and a vane extending from the outer surface. The side edges of the segments have a groove formed therein which extends the length of said the edges. The grooves of neighboring segments define channel between the segments. A pin or liner lock key is received in the channel to urge the neighboring segments apart to form a tight interfit among the segments in a row of the liner. The retaining pin has a body having side surfaces, a top surface, and a bottom surface. A hole extends through the pin body and receives a dowel, which is sized to extend from opposite sides of said pin body. The dowel is shaped and sized to be received in the grooves of the neighboring segments. An arm extends upwardly from the pin body top surface. The pin arm conforms in shape and size to the side profile of the vane, and is positioned on the pin body to be in alignment with the vane of the adjacent segments, to form a continuous vane on the outer surface of the liner. In another embodiment of the liner segments, the segments are secured to each other and to the outer cylinder of the tumbler.

10 Claims, 8 Drawing Sheets

LINER LOCK KEY FOR TUMBLER LINER SEGMENTS

CROSS-REFERENCE TO RELATED APPLICATIONS

This is a continuation-in-part of co-pending application Ser. No. 09/398,286 filed Sep. 20, 1999, now U.S. Pat. No. 6,273,176.

STATEMENT REGARDING FEDERALLY SPONSORED RESEARCH OR DEVELOPMENT

Not Applicable.

BACKGROUND OF THE INVENTION

This invention relates to casting shake-out units used to separate or remove sand from castings, and in particular, to a liner which forms the inner surface of the shake-out unit.

In the formation of a tumbling mill, such as a casting shake-out unit, rotary separator, media drum, material drier, lump crusher reclaimer, blending drum, sand screen, or the like, it is desirable to form the inner surface of the mill from segments. Thus, when individual segments wear out, they can be replaced easily and rapidly without the need to incur a significant amount of downtime or expense. An example of a shake-out unit having segmented inner liners is shown in U.S. Pat. No. 3,998,262 with is assigned to the same assignee as the present invention, and which is incorporated herein by reference. As set forth in that patent, the inner cylinder forming the inner surface of the unit is formed from a series of interconnected modular components. The operation of that unit, for its intended purpose, has performed highly satisfactorily. However, when the casting shake-out unit is operated continuously, the wear on the components causes the components or segments to gradually loosen. This requires a retightening of the entire formed inner surface. This retightening operation requires that the operator incur a significant amount of down time.

It is desirable for the mill to operate for a longer period before the segments begin to loosen and separate. In U.S. Pat. Nos. 4,502,808, 5,638,887, and 5,638,890, all of with are assigned to the same assignee as the present invention and incorporated herein by reference, the side edges of the segments are grooved to define a channel between neighboring segments. A pin or bar is inserted in the channel. In a completed lining, the bars tend to urge the segments apart, thus creating a tight fit in the completed cylindrical lining. These have also worked well. However, the pins and the interlocking of the liner segments can still be improved.

BRIEF SUMMARY OF THE INVENTION

A tumbling unit such as a casting shake-out unit, rotary media drum, sand reclaimer or the like, is provided. The tumbling unit includes a cylindrical outer shell and a cylindrical inner shell. The inner liner is formed of a series of interfitting segments. The segments each have an inner surface, an outer surface, side edges, a front edge, a back edge, and a vane extending from the outer surface. The side edges of the segments have a groove formed therein which extends the length of said the edges. The grooves of neighboring segments define channel between the segments. To enable the segments to interfit, the segments include tongues on their segment front and back edges and cutouts in their corners. The tongues and cutouts are shaped and positioned to enable the segments to interfit with each other.

The pin or liner lock key is received in the channel to urge the neighboring segments apart to form a tight interfit among the segments in a row of the liner. The retaining pin has a body having side surfaces, a top surface, and a bottom surface. In one embodiment, a rib extends along each side surface which is shaped and sized to be received in the grooves of the neighboring segments. In a second embodiment, the rib is replaced with at least one dowel which extends through at least one opening in the pin body. The dowel extends from opposite sides of the pin, and the portions of the dowel extending from the pin are received in the grooves of the segments. An arm extends upwardly from the pin body top surface. When the pin is placed between two neighboring segments, it separates the segments. The pin arm conforms in shape and size to the side profile of the vane, and is positioned on the pin body to be in alignment with the vanes of the adjacent segments, to form a continuous vane on the liner. The pins have cutouts at opposite ends thereof which conform generally in size and shape to the profile of the segment cutouts.

In a second embodiment, the segments include a first and a second side, and a front and a back side. A first side flange extends along the first side; a second side flange extends along the second side; a front flange extends along the front side; and a back side flange extends along the back side. The flanges all have a width equal to approximately one-half the width of the segment body between the inner and outer surfaces of said segment body. The first side flange and bottom flange have a surface generally flush with one of the inner and outer surfaces of the segment; and the second side flange and the top flange have a surface generally flush with the other of the inner and outer surfaces of the segment. This gives the segment the appearance of two rectangles being placed on top of each other, with one rectangle being diagonally offset from the other rectangle.

In a third embodiment, the liner segments are provided with flanges extending along the side edges of the segments on the outer surface of the segments. The flanges include bolt holes which extend therethrough. When the segments are assembled together, the flanges of adjacent segments are adjacent each other, with their bolt holes aligned. A fastener, such as a bolt, pin, post, etc. is passed through the holes to retain the segments of a row of segments together. Holes are also placed in the bottom of the vane, at opposite ends of the vane. A pin, which is fixed to the outer cylinder, extends into the vane hole, to secure the segment to the outer cylinder.

BRIEF DESCRIPTION OF THE SEVERAL VIEWS OF THE DRAWINGS

Corresponding reference numerals will be used throughout the several figures of the drawings.

DETAILED DESCRIPTION OF THE INVENTION

The following detailed description illustrates the invention by way of example and not by way of limitation. This description will clearly enable one skilled in the art to make and use the invention, and describes several embodiments, adaptations, variations, alternatives and uses of the invention, including what we presently believe is the best mode of carrying out the invention.

Figure 1:
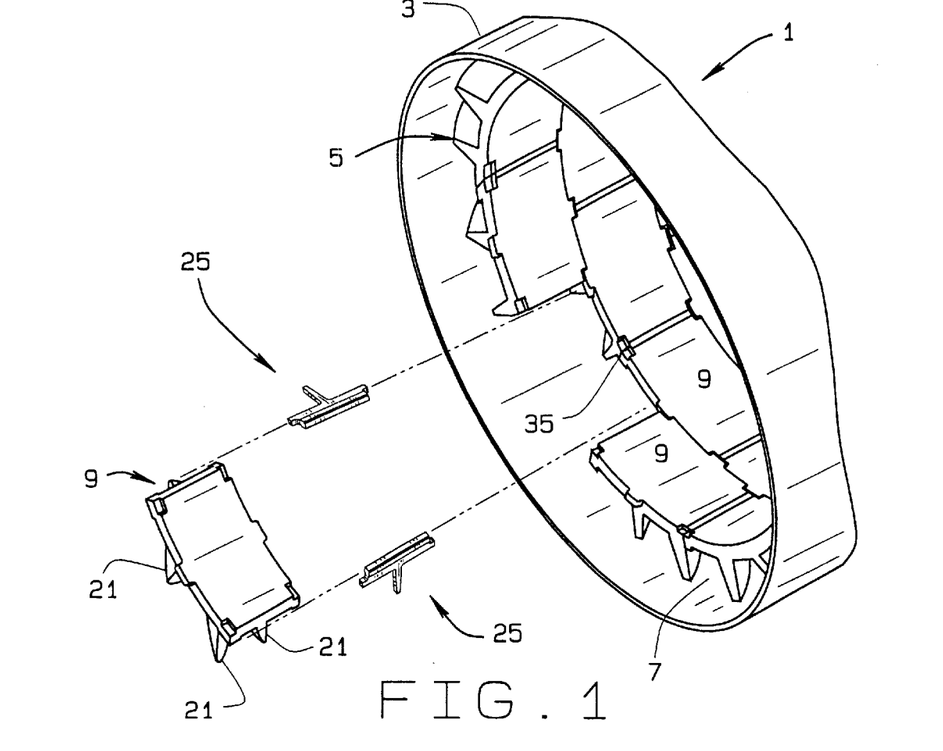
FIG. 1 is a partial perspective end view of a tumbling unit which is partially exploded to show one segment and a pair of retaining pins removed and with inner riflings not shown for purposes of clarity.

A tumbling mill 1 is shown generally in FIG. 1. Tumbling mill 1 is preferably a mill constructed and operated in the manner disclosed in the above noted U.S. Pat. No. 3,998,262 to remove sand from casting by tumbling the castings. As shown, the mill 1 generally includes an outer cylinder 3 and an inner cylinder 5. The inner cylinder 5 is of a smaller diameter than the outer cylinder 3, and the two cylinders define a space 7 between the cylinders. The inner liner or cylinder 5 is made of a plurality of interlocking segments 9 which fit together to form the cylinder 5. Importantly, as described below, the segments 9 positively lock together so that segments will not fall out of the lining as they wear. This advantageously increases the time the mill may be continuously operated before it has to be shut down to tighten the inner liner 5.

The segment 9 is similar to the segments described in the above noted U.S. Pat. No. 5,638,890, which is incorporated herein by reference. Each segment 9 includes a generally arcuate body 11 having an inner surface 13, an outer surface 15, side edges 17, and front and back edges 19. Each segment preferably covers approximately 35°–40° of arc. To space the segments 9, and hence, the inner cylinder 5, from the outer cylinder 3, each segment 9 has diagonally extending ribs or vanes 21 formed its outer surface 15. The vanes 21 are positioned on segment 9 so that when a plurality of the segments are connected to form inner cylinder 5, the vanes from one segment abut respective vanes from neighboring segments to provide a continuous vane along the cylinder surface. The inner cylinder 5 is preferably perforated so that the sand which is separated from the castings may fall into the space 7 between the inner and outer cylinders. The segments 9 thus have a plurality of holes or perforations 22 formed therein to allow sand to fall into the space 7 between the inner and outer cylinders. A slot or groove 23 is formed along the side edges 17 to receive a pin 25 which spaces the segments apart in the completed inner cylinder to tighten the fit between the segments of the inner cylinder. The pin 25 is described in more detail below. The groove 23 extends the full length of the side edges 17.

Figure 4:
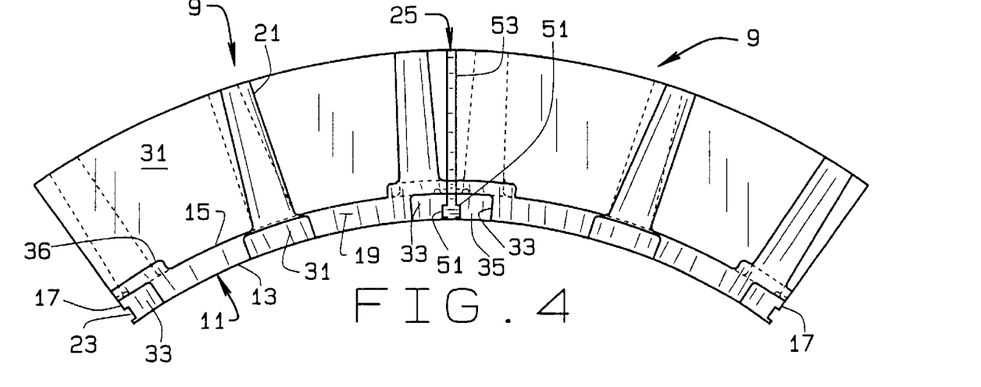
FIG. 4 is an end elevational view of a pair of segments adjacent each other with a pin positioned between them.
Figure 5:
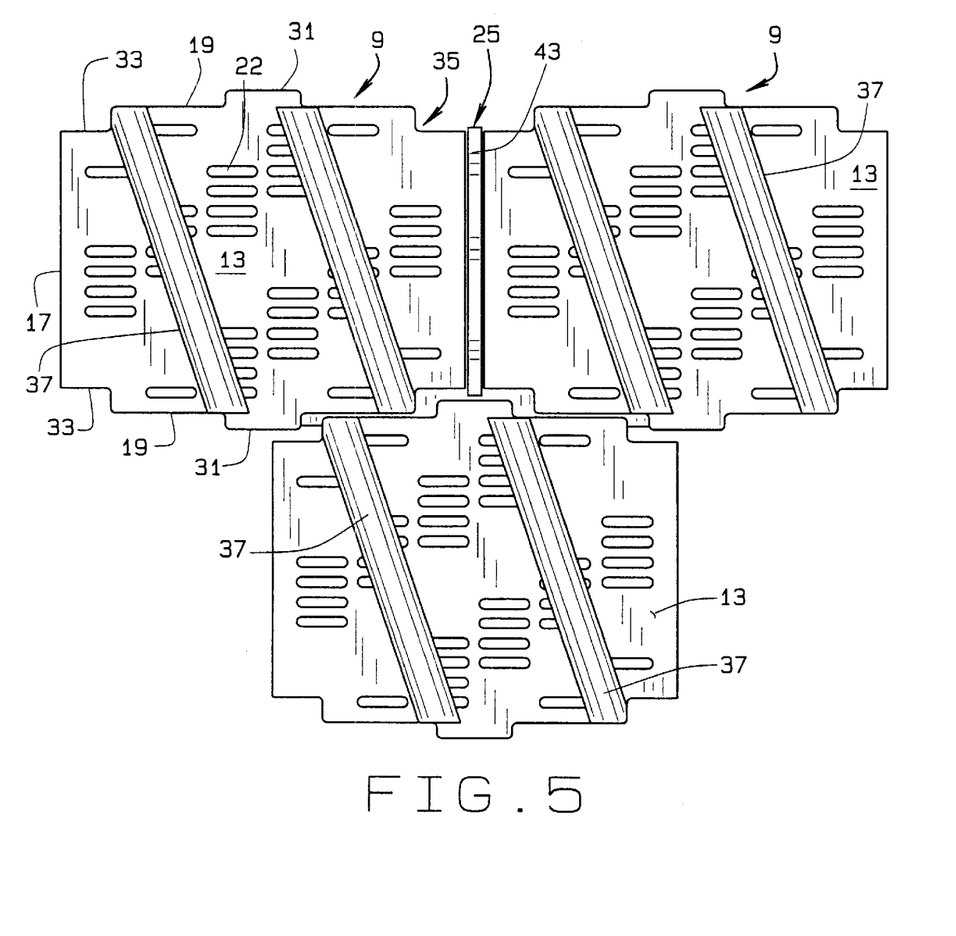
FIG. 5 is an inner plan view of three segments positioned together.

To enable the segments 9 to interlock with each other, each segment includes a tongue 31 extending from the approximate center of the front and back edges 19 and generally rectangular cutouts 33 at the four corners of the liner body 11. The cutouts 33 define pockets 35 when two segments 9 are placed adjacent each other along their side edges 17. The formed pocket receives the tongue 31 of a further segment 9 which is placed adjacent the two segments along the front and back edges 19 of the segments, as seen in FIG. 5. The tabs 31 extend the full width of the body 11 between the inner and outer surfaces 13 and 15. The body, however, includes a raised portion 36 (FIG. 4) on the outer surface 15 which covers the cutouts 33. Thus, the pockets 35 are closed on one side. When the liner 5 is assembled, the raised portions or covers 36 rest on the tongues 31, thereby interlocking the segments 9 of adjacent different rows of segments.

As seen in FIG. 5, the segments 9 include rifling 37 on their inner surfaces 13. The rifling is not shown in FIG. 4 for purposes of clarity. In the completed lining, the rifling helps move castings through the mill. The rifling 37 is formed on the segments so that the rifling of one row of liner segments is off-set from the rifling of an adjacent row of liner segments. Thus, the rifling or ribs 37 do not form continuous ribs or rifling along the inner surface of the liner 5.

The retaining pins 25 are positioned between the side edges 17 of adjacent or neighboring segments 9. The pins 25 are shown in more detail in FIGS. 2 and 3. Each pin 25 includes an elongate, generally rectangular body 41 having side walls 43, a top surface 45, and a bottom surface 47. The body 41 has a length substantially equal to the length of the segment side 17. So that the pin will not interfere with the interlocking of the segments 9, the pin body includes a cut out 49 on either end of the body. The cutout 49 corresponds in size and shape to the side profile of the cutouts 33 in the segments 9.

A rib 51 extends along each side surface 43 of the pin body 41. The ribs 51 are sized and shaped to be received in the grooves 23 in the segment sides 17. Additionally, an arm 53 extends up from the pin body top surface 45. As seen in FIG. 4, the arm 53 is positioned on the pin body 41 such that it is aligned with the vanes 21 of the liner segments 9 when the liner 5 is assembled. Thus, the arm 53, as seen, is generally trapezoidal in side elevation (FIG. 2), and rectangular in front elevation (FIG. 3), which corresponds in size and shape to the side profile of the segment ribs 21. Thus, the ribs 51 provide for a smooth transition between the vanes 21 of the segments 9, as well as of the inner surfaces 13 of the segments 9.

When the segments 9 are interconnected, the pins 25 tighten the liner or inner cylinder 5, as set forth in the above noted U.S. Pat. No. 4,502,808, to lengthen the time before the segments come loose from each other due to continuous operation of the mill. The interconnection of the segments, in turn, prevents a segment from falling out when the pin wears. Thus, if a pin 25 wears, the interaction between the tongue 31 and its associated pocket 35 will prevent the segment from falling out from the inner cylinder 5. Although the segment will be loose when the pin wears through, the segment will not fall out. This will allow the operator time to normally shut down the mill to insert a new pin or a new segment.

Figure 9:
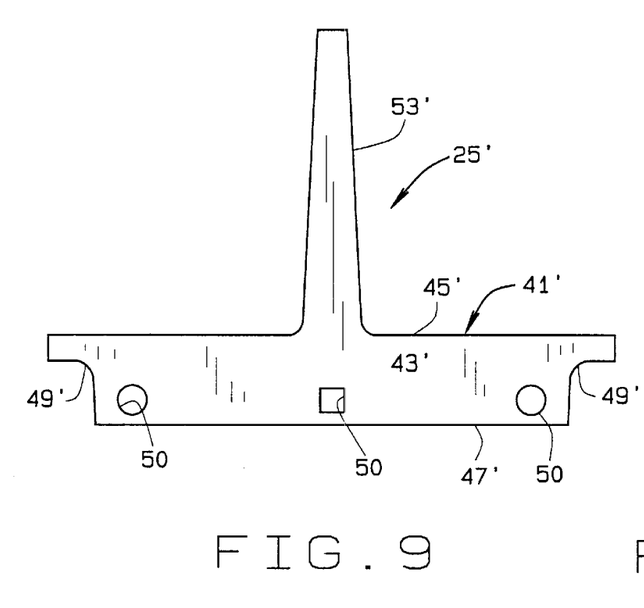
FIG. 9 is an front elevational view of an alternative embodiment for the pin.
Figure 10:
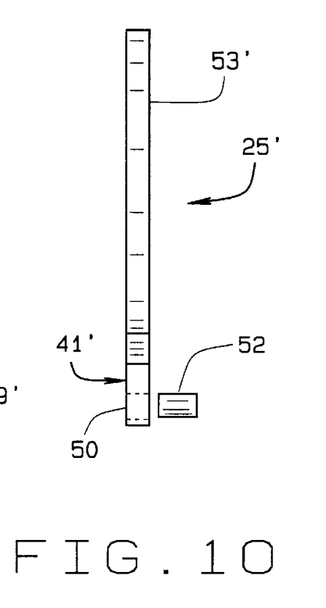
FIG. 10 is a side elevational view of the pin of FIG. 9.

An alternative embodiment of the pin is shown in FIGS. 9 and 10. The pin 25' includes an elongate, generally rectangular body 41' having side walls 43', a top surface 45', and a bottom surface 47'. The body 41' has a length substantially equal to the length of the segment side 17. So that the pin will not interfere with the interlocking of the segments 9, the pin body includes a cut out 49' on either end of the body. The cutout 49' corresponds in size and shape to the side profile of the cutouts 33 in the segments 9.

Figure 2:
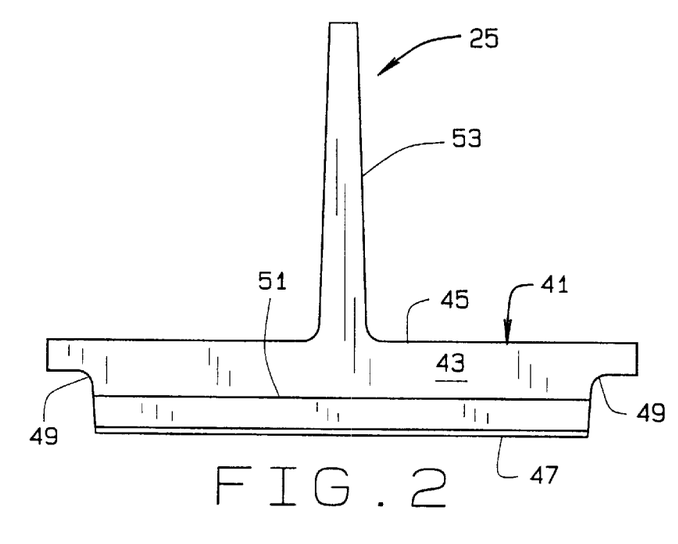
FIG. 2 is a side elevational view of the pin.
Figure 3:
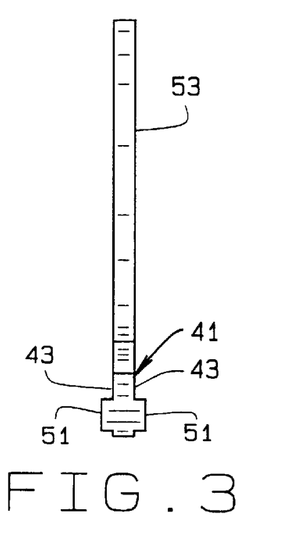
FIG. 3 is an end elevational view of the pin.

The pin 25' does not include a rib, as does the pin 25 of FIGS. 2 and 3. Rather, the pin 25' includes openings 50 in the body 41' which receive dowels 52. The pin 25' is shown with three openings 50, spaced generally equally apart. For purposes of illustration, the two outer openings 50 are shown to be circular and the middle opening 50 is shown to be square. However, all the openings could be circular or they could all be square; or, the openings could be any other desired shape. Additionally, one opening or four or more openings 50 could be provided in the body 41'. The dowel 52 is shaped complimentarily to the holes, to be slidingly received in the holes 50. The dowel 52 has a length, such that it will extend from the sides of the pin body 41' and into the grooves 23 of the liner segments 9 when the liner is assembled. Additionally, an arm 53' identical to the arm 53 of pin 25 extends up from the pin body top surface 45'. The pin 25' is shown with three holes 50—two holes near the ends of the body and one hole generally centered with respect to the body and generally aligned with the pin arm 53'. The body 41' could be provided with more or fewer holes 50 is desired.

Figure 6:
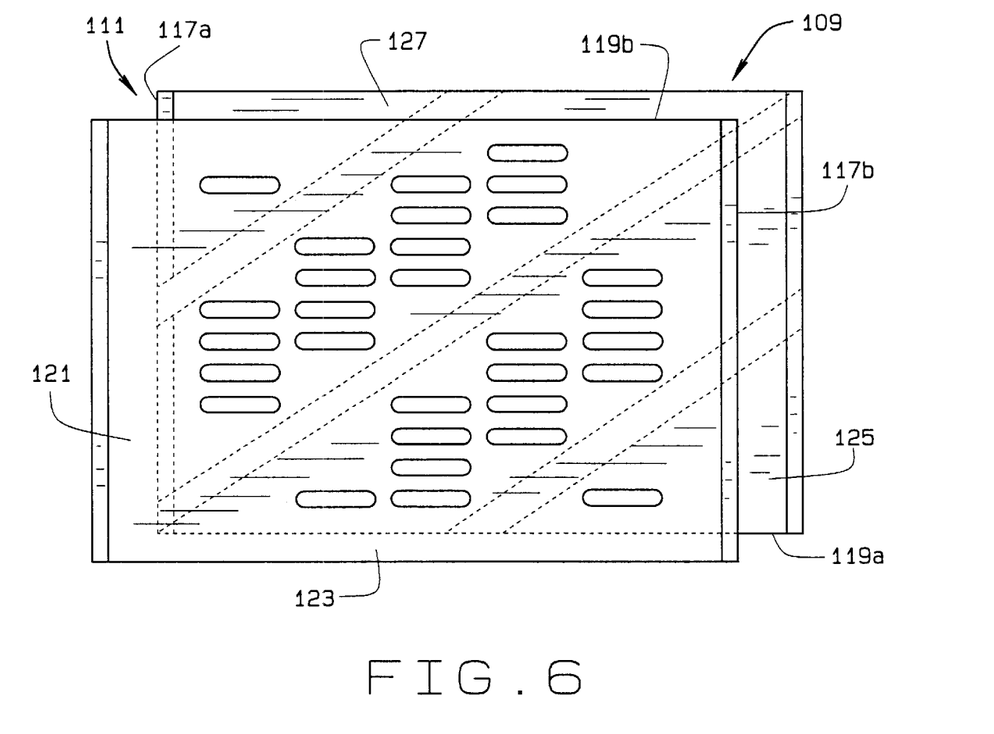
FIG. 6 is a top plan view of an alternative embodiment of the inner liner segment.
Figure 7:
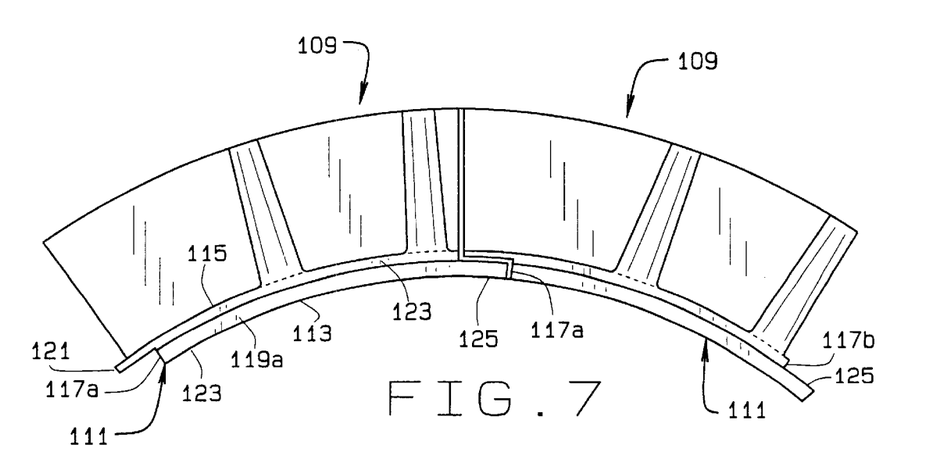
FIG. 7 is a side elevational view of a pair of segments of FIG. 6 adjacent each other.
Figure 8:
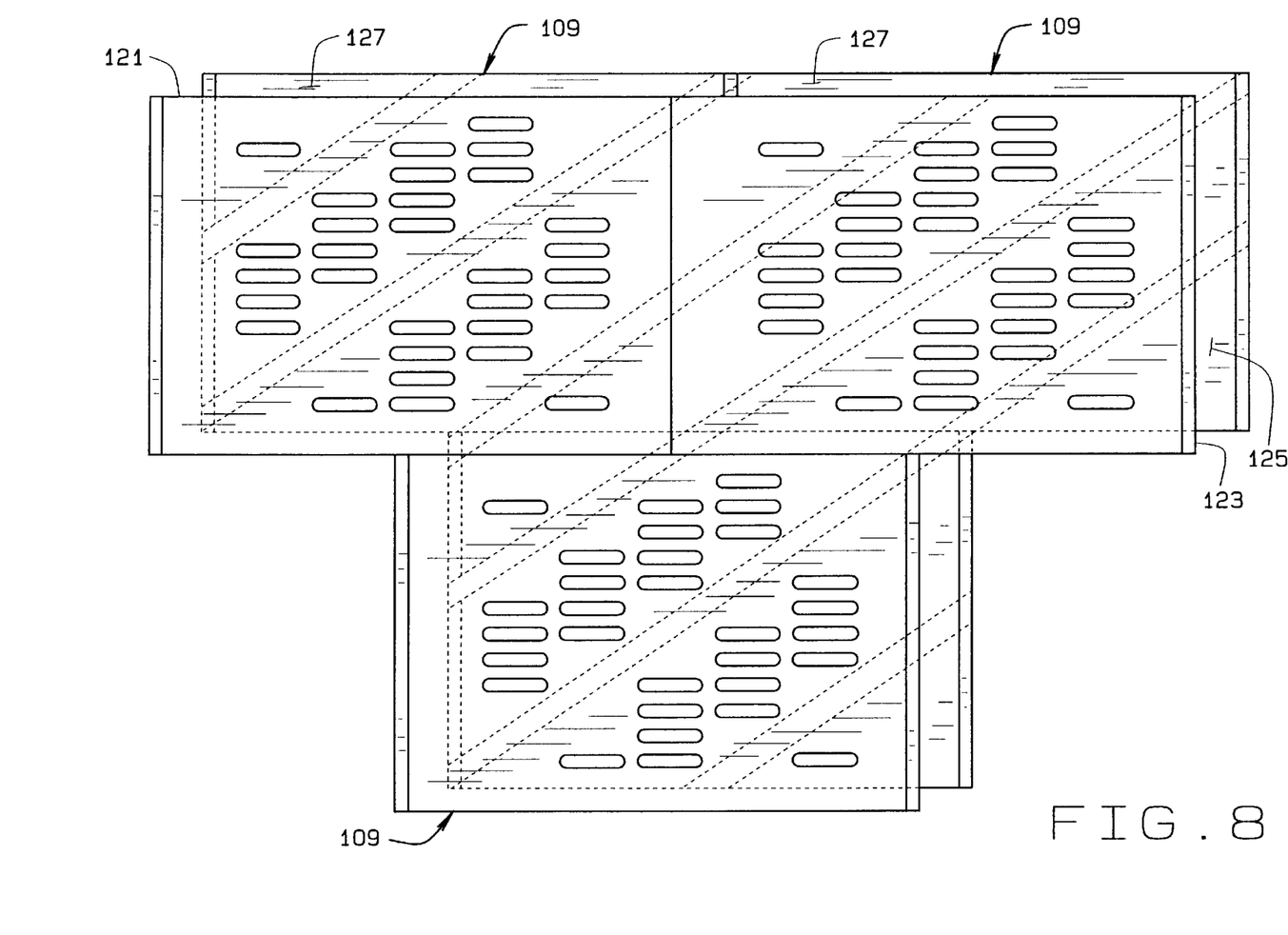
FIG. 8 is an inner plan view of three segments of FIG. 6 positioned together.

A second embodiment of the segments is shown in FIGS. 6–8. The segments 109 include a generally arcuate body 111 having an inner surface 113, an outer surface 115, a first side edge 117a, a second side edge 117b, a front edge 119a, and a back edge 119b. A first side flange 121 extends from the body along side 117a and a front flange 123 extends along the front edge 119a. A second side flange 125 extends along side 117b and a back flange 127 extends along the back 119b. The flanges 121, 123, 125, and 127 have a top to bottom thickness of about ⅔ of the thickness of the segment body 111 between its inner and outer surfaces. The flanges 121 and 123 both have top surfaces which are continuations of the outer surface 115 of the segment body; and the flanges 125 and 127 have bottom surfaces which are continuations of the inner surface 113 of the segment body. Thus, as seen in FIG. 6, the body, in top plan, appears as two rectangles placed on top of each other and diagonally offset from each other.

To assemble the inner cylinder from the segments 109, the segments are assembled with their flanges in overlapping relationship, as shown in FIGS. 7 and 8. As with the segments 9, the overlapping relationship of the flanges of the segments 109 will prevent the segments from falling out of the inner cylinder as the segments become worn. Although not shown in the drawings, grooves can be formed in the edge of the flange 121 and in the body side 117b to accept the pin 25.

A third embodiment of the liner segment is shown in FIGS. 11–16. The liner segments 209 include a generally arcuate body 211 having an inner surface 213, an outer surface 215, side edges 217, and front and back edges 219. Each segment preferably covers approximately 35°–40° of arc. To space the segments 209, and hence, the inner cylinder 205 formed from the segments 209, from an outer cylinder 203, each segment 209 has diagonally extending ribs or vanes 221 formed on its outer surface 215. The vanes 221 are positioned on segment 209 so that when a plurality of the segments are connected to form inner cylinder 205, the vanes from one segment abut respective vanes from neighboring segments to provide a continuous vane along the cylinder surface. The inner cylinder 205 is preferably perforated so that the sand which is separated from the castings may fall into the space 207 between the inner and outer cylinders. The segments 209 thus have a plurality of holes or perforations 222 formed therein to allow sand to fall into the space 207 between the inner and outer cylinders.

To enable the segments 209 to interlock with each other, each segment includes a tongue 231 extending from the approximate center of the front and back edges 219 and generally rectangular cutouts 233 at the four corners of the liner body 211. The cutouts 233 define pockets 235 (FIG. 15) when two segments 209 are placed adjacent each other along their side edges 217. The formed pocket receives the tongue 231 of a further segment 209 which is placed adjacent the two segments along the front and back edges 219 of the segments, as discussed above in conjunction with the liner segment 9 of FIG. 1, and as shown in FIGS. 4 and 5. The tongues 231 extend the full width of the body 211 between the inner and outer surfaces 213 and 215. The body, however, includes a raised portion 236 on the outer surface 215 which covers the cutouts 233. Thus, the pockets 235 are closed on one side. When the liner 205 is assembled, the raised portions or covers 236 rest on the tongues 231, thereby interlocking the segments 209 of adjacent different rows of segments.

To hold the liner segments 209 in place relative to each other in the formed inner liner 205, the segments 209 include downwardly extending flanges 241 at the segment sides 217. The flange extends along the segment sides 217 between the edges of the cutouts 233. The flange 241 include bolt holes 243. In the assembled liner 205, the flanges 241 and their bolt holes 243 of adjacent segments 209 are aligned, a bolt 245 is passed through the holes 243 of the adjacent flanges 241, and a nut is applied to the threaded end of the bolt to hold the segment in place. As can be appreciated, the segments of a single row of segments in the liner are secured together in this fashion. Although, adjacent rows are not secured together, they could be. Rather, the interaction of the tongues 231 of the segments of one row with the pockets 235 of the segments of the adjacent rows will substantially prevent slippage of one row of segments relative to another row of segments.

Figure 11:
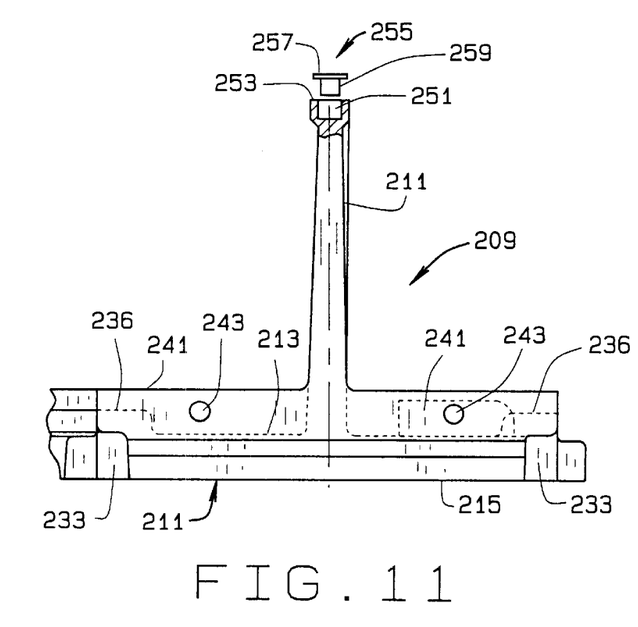
FIG. 11 is an end elevational view of a third embodiment of the liner segment partly in cross-section and showing a pin used to positionally secure the liner segment to an outer cylinder of the tumbler.
Figure 12:
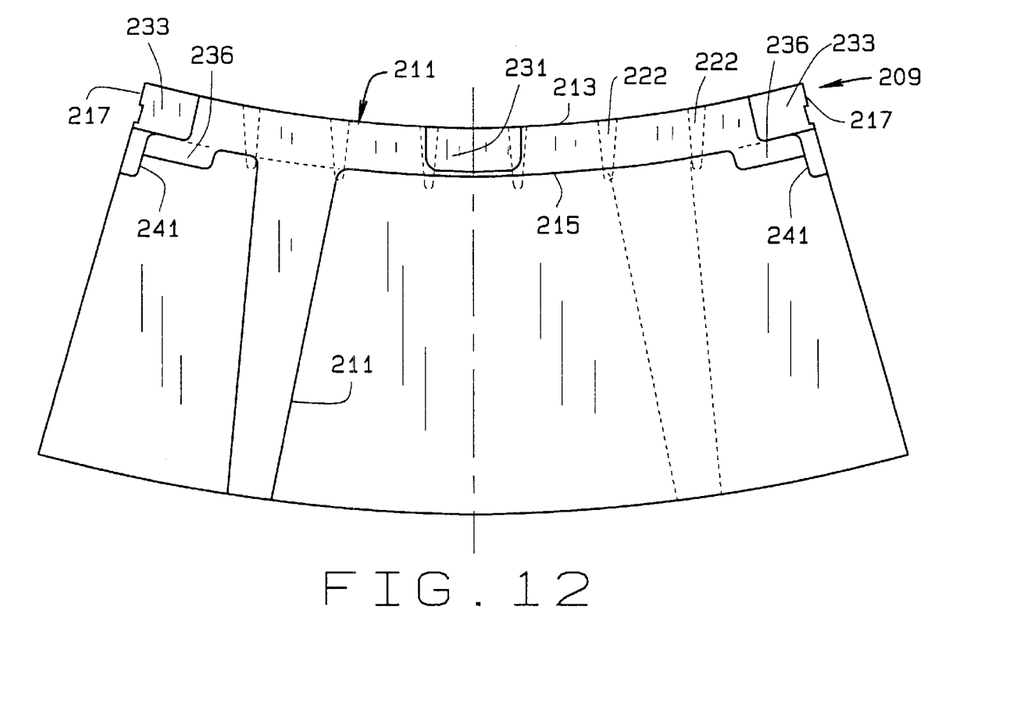
FIG. 12 is a side elevational view of the liner segment of FIG. 11.
Figure 13:
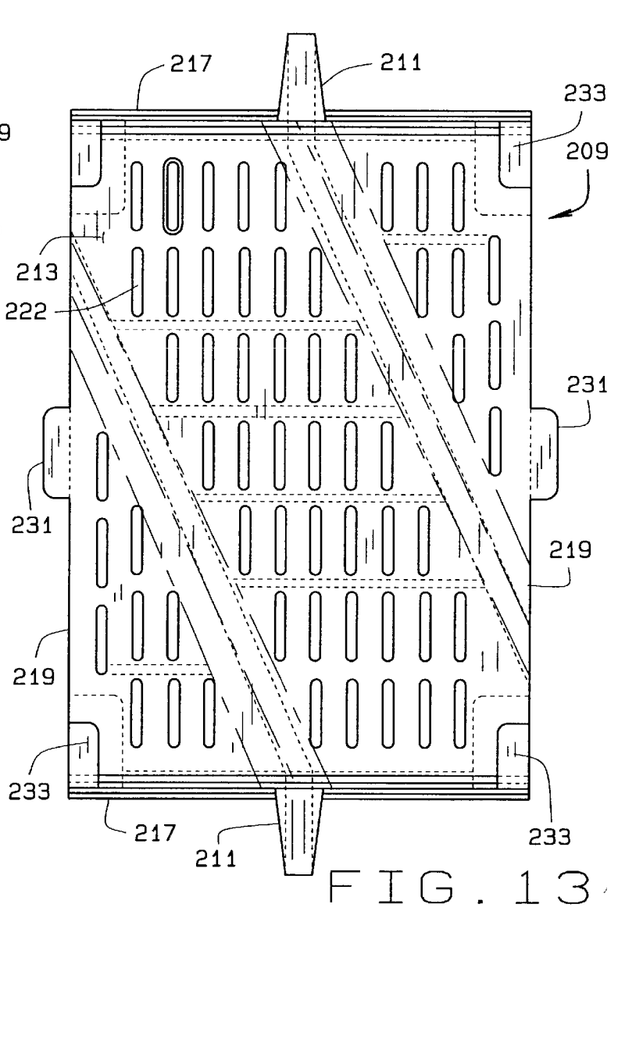
FIGS. 13 and 14 are top and bottom plan views of the liner segment of FIG. 11.
Figure 14:
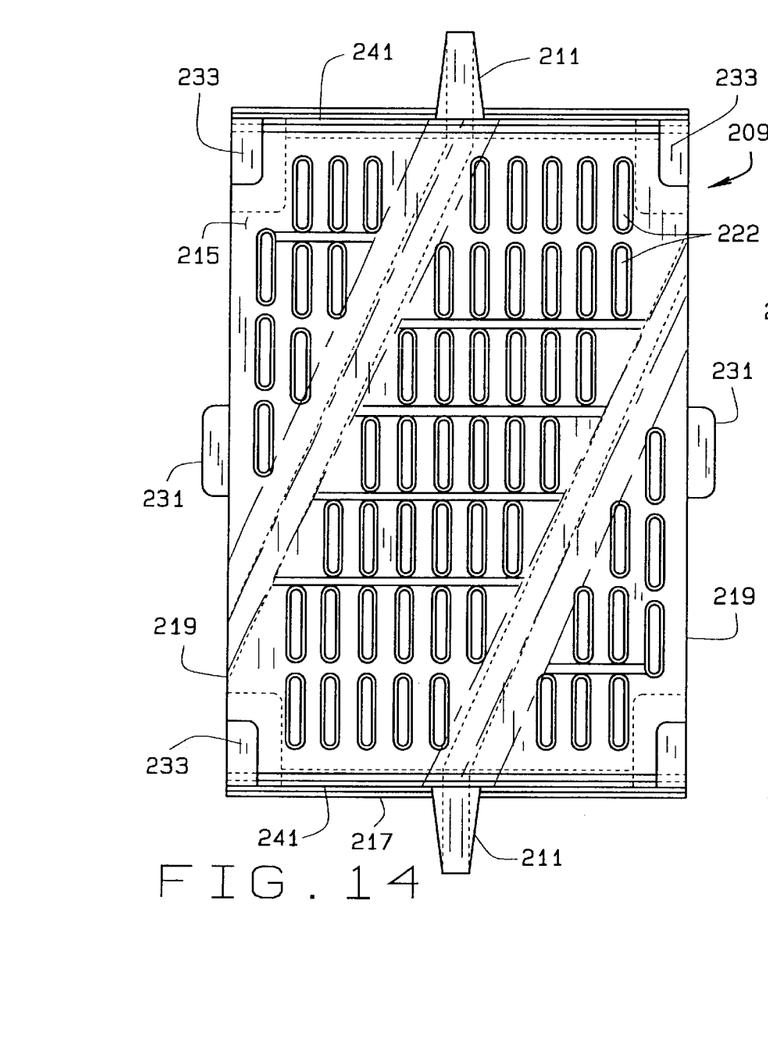
Figure 15:
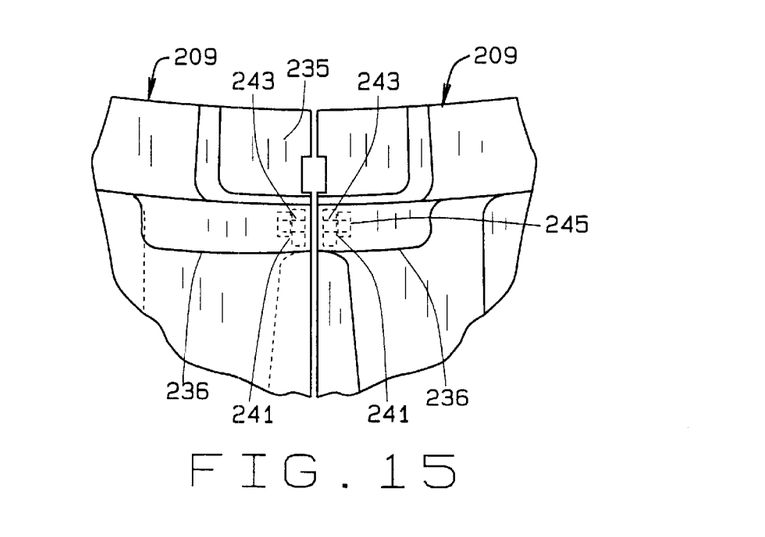
FIG. 15 is a fragmentary view showing tow segments joined together.
Figure 16:
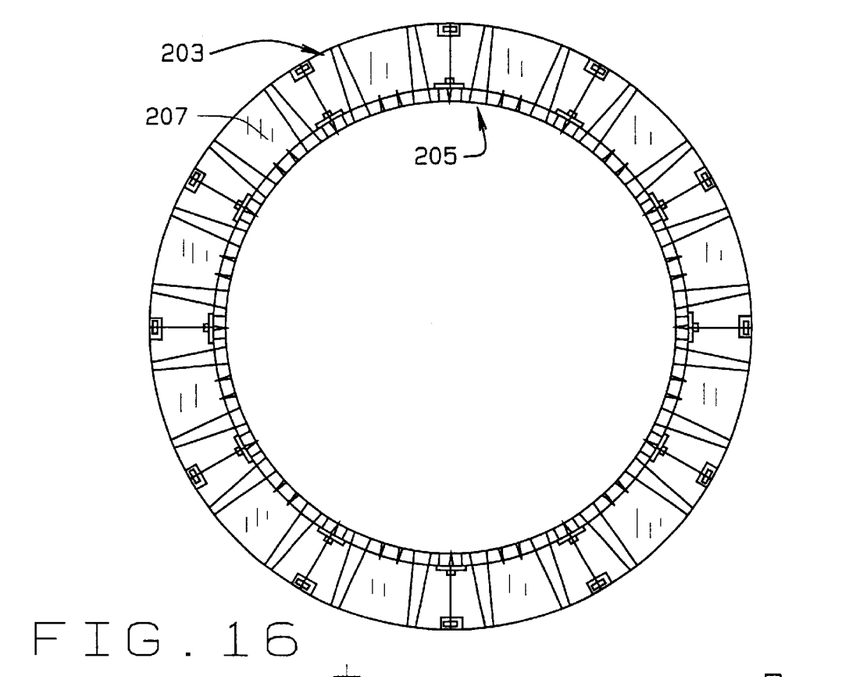
FIG. 16 is a side elevational view of a tumbler assembled with liner segments of FIG. 11.

Additionally, holes 251 are formed in the bottom surfaces 253 of the segment vanes 221 at the lateral ends of the vane 221. The holes 251 are sized to receive a pin 255. The pin 255 has a head 257 which is welded to the outer cylinder 203 and a body 259 which extends radially inwardly from the outer cylinder 203 and into the hole 251 at the bottom of the vane 221. The pin body 259 and the vane hole 251 are shaped complimentarily to each other. They can be circular, square, or any other desired shape. Use of the pins 255 anchors each liner segment 209 to the outer cylinder 203 in two places. With a pin 255 positioned at both ends of the vane of each segment 209, the pin 255 will fix the relative position of the liner segments with respect to the outer cylinder 203. Hence, the rows of segments 206 will not be able to mover relative to the outer cylinder 203. Further, the interaction of the pins 255 (which are welded to the outer cylinder 203) with the segments 209, will prevent one row of segments from moving relative to an adjacent row of segments.

Figure 17:
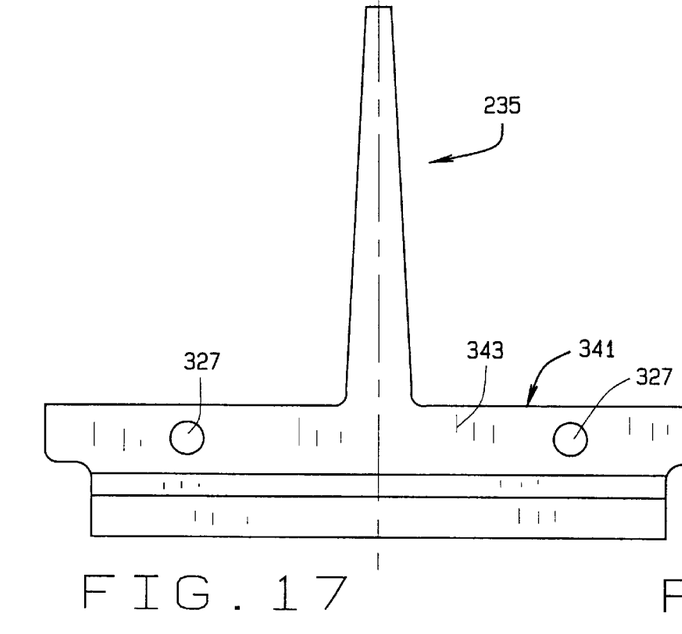
FIG. 17 is an end view of a liner lock key for use with the liners of FIG. 11.
Figure 18:
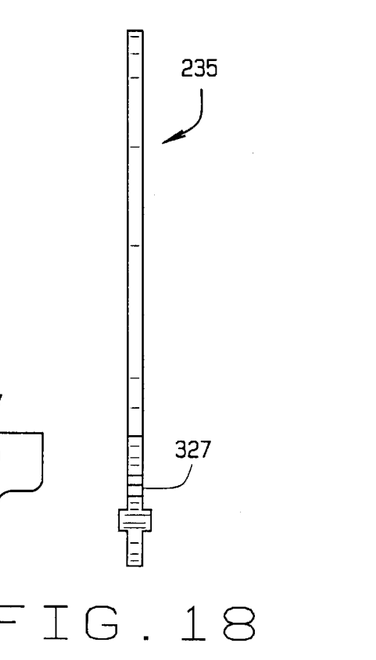
FIG. 18 is a side elevational view of the liner lock key of FIG. 14.

The segments 209 are described as being assembled without the use of a liner lock key, such as the liner lock key 25 of FIGS. 2–3 or 9–10. However, a liner lock key, 325, such as shown in FIGS. 17–18 can be used. In this case, the segments are provided with a slot or groove in the side edges, similar to the slot or groove 23 of the liner segment 9 (FIG. 4). The key 325 is shown formed similarly to the key 25, but could also be formed similarly to the key 25' of FIGS. 9–10. The difference between the key 325 and the key 25 or 25', is that the key 325 is provided with bolt holes 327 in the side wall 343 of the body 341. The bolt holes 327 line up with the bolt holes 243 in the flanges 241. The bolt 245 then passes through the bolt holes 243 of the liner segments 209 as well as the bolt holes 327 of the liner lock key. Alternatively, retaining rods, such as disclosed in co-assigned U.S. Pat. Nos. 5,638,890, 5,638,887, and 4,502, 808 (all of which are incorporated herein by reference) could be used in place of the liner lock key 325.

As can be appreciated, the segments of the present invention will cooperate with each other to prevent a segment from separating from the lining when a pin wears or breaks. Although the segment may be somewhat loose, the mill 1 will still be operable, at least for a short period of time, before the segment must be replaced. This will allow for a normal shut down of the machine, rather than an emergency shut down of the machine which would be needed if the segment did separate from the lining. The pin will provide a smooth and continuous transition between the plates, so that the castings and sand see only continuous substantially uninterrupted inner and outer surfaces for the lining 5 and continuous substantially uninterrupted vane along the liner outer surface.

As various changes could be made in the above constructions without departing from the scope of the invention, it is intended that all matter contained in the above description or shown in the accompanying drawings shall be interpreted as illustrative and not in a limiting sense. For example, the liner segment 209 could be modified such that the flanges on one side of the segment include posts extending axially therefrom, and the flanges on the opposite side of the segments include the holes sized to receive the posts. Thus, the posts of one segment would be received in the flanges holes of the adjacent segment, eliminating the need for separate bolts. This example is merely illustrative.

What is claimed is:

1. A tumbling unit such as a casting shake-out unit, rotary media drum, sand reclaimer or the like, the tumbling unit comprising:
   a cylindrical outer shell;
   a cylindrical liner positioned within said outer shell, said liner being formed of a series of interfitting segments, said segments having an inner surface, an outer surface, side edges, a front edge, a back edge, and a vane extending from said outer surface to said cylindrical outer shell; the side edges of the segments having a groove formed therein and extending the length of said side edges, the grooves of neighboring segments defining channel between neighboring segments; and
   an elongate retaining pin received in said channel to urge adjacent segments apart to form a tight interfit among the segments in a row of said liner, said retaining pin including a body having side surfaces, a top surface, and a bottom surface; at least one opening in said pin body extending through said pin body from one side of said pin body to another side of said pin body and at least one dowel received in said at least one hole and sized to extend through said hole and beyond the sides of said body; said dowel being shaped and sized to be received in the grooves of the adjacent segments; and an arm extending upwardly from said pin body top surface; said pin separating adjacent liner segments, said pin arm conforming in shape to, and being in alignment with, the vanes of the adjacent segments, to form a continuous vane on said liner.

2. The tumbling unit of claim 1 wherein said liner segments include tongues on said segment front and back edges, and cutouts in corners of said segments; said tongues and cutouts being shaped and positioned to enable said segments to interfit with each other; said pins having cutouts at opposite ends thereof; said pin cutouts conforming generally to the profile of the segment cutouts.

3. The tumbling unit of claim 1 wherein said liner segments include flanges at opposite edges of said segments; the flanges of one segment being proximate the flanges of an adjacent segment; said flanges including holes positioned such that the holes of flanges of adjacent segments are aligned with each other; and fasteners extending through said flange holes to secure said liner segments together.

4. The tumbling unit of claim 1 wherein said segments include at least one hole formed in an outer surface of said vane; said tumbling unit including a pins which are fixed to said outer cylinder and extend into said holes in said vane of each said segment.

5. A retaining pin for use in a cylindrical tumbling unit to force a tight interfit between neighboring segments of the tumbling unit; said neighboring segments each having an side edge, a groove formed in said edge, and a vane on an outer surface of said segments and extending to said outer cylinder; the grooves of neighboring segments defining a channel;
   said retaining pin including a body having side surfaces, a top surface, and a bottom surface; at least one hole in said pin body extending through said pin body from one side of said pin body to another side of said pin body and at least one dowel received in said at least one hole and sized to extend through said hole and beyond the sides of said body, said at least one dowel being shaped and sized to be received in the grooves of neighboring segments; and an arm extending upwardly from said pin body top surface; said pin separating neighboring liner segments, said pin arm conforming in shape to, and being in alignment with, the vanes of the neighboring segments, to form a continuous vane on said liner.

6. A tumbling unit such as a casting shake-out unit, rotary media drum, sand reclaimer or the like, the tumbling unit comprising:
   a cylindrical outer shell having pins fixed to an inner surface of said outer shell and extending inwardly from said outer shell inner surface;
   a cylindrical liner positioned within said outer shell, said liner being formed of a series of interfitting segments, said segments having an inner surface, an outer surface, side edges, a front edge, a back edge, and a vane extending from said outer surface; at least one hole formed in an outer surface of said vane; said outer shell pins being received in said at least one hole of said vane.

7. The tumbling unit of claim 6 including outwardly extending flanges at opposite edges of said segments; the flanges of one segment being proximate the flanges of an adjacent segment; said flanges of adjacent segments being adapted to be secured together.

8. The tumbling unit of claim 7 wherein said flanges include a hole extending therethrough; the flange holes of adjacent liners being aligned; and said tumbling unit including fasteners which extend through said flange holes to secure said liner segments together.

9. A tumbling unit such as a casting shake-out unit, rotary medium drum, sand reclaimer, or the like, the tumbling unit comprising:

a cylindrical outer shell;

a cylindrical liner position within said outer shell, said liner being formed of a series of interfitting segments, said segments having an inner surface, an outer surface, side edges, a front edge, a back edge, and a vane extending from said segment outer surface;

flanges extending from opposite edges of said segments;

the flanges of one segment being proximate to flanges of an adjacent segment;

said flanges of adjacent segments being adapted to be secured together;

said flanges including at least one hole extending therethrough and fastening means;

the fastening means of one segment extending through the at least one hole of an adjacent segment to secure said liner segments together.

10. A tumbling unit such as a casting shake-out unit, a rotary medium drum, sand reclaimer, or the like, the tumbling unit comprising:

a cylindrical outer shell;

a cylindrical liner positioned within said outer shell, said liner being formed of a series of interfitting segments, said segments having an inner surface, and outer surface, side edges, a front edge, a back edge, and a vane extending from said segment outer surface;

flanges extending from opposite edges of said segments;

the flanges of one segment being proximate to flanges of an adjacent segment;

said flanges of adjacent segments being adapted to be secured together;

said segments including at least one hole formed in and outer surface of said vane;

said tumbling unit including pins which are fixed to said outer cylinder and extend into said at least one hole in said vane of each said segment.

* * * * *